US006575669B2

(12) United States Patent
Takasan

(10) Patent No.: US 6,575,669 B2
(45) Date of Patent: Jun. 10, 2003

(54) METHOD FOR TRANSFERRING LEVITATED OBJECTS

(75) Inventor: Masaki Takasan, Kariya (JP)

(73) Assignee: Kabushiki Kaisha Toyota Jidoshokki, Kariya (JP)

(*) Notice: Subject to any disclaimer, the term of this patent is extended or adjusted under 35 U.S.C. 154(b) by 1 day.

(21) Appl. No.: 09/982,039

(22) Filed: Oct. 17, 2001

(65) Prior Publication Data
US 2002/0046606 A1 Apr. 25, 2002

(30) Foreign Application Priority Data
Oct. 25, 2000 (JP) ........................................ 2000-325345

(51) Int. Cl.[7] .............................................. B65G 53/00
(52) U.S. Cl. ........................... 406/197; 406/85; 406/39; 406/86; 414/353; 198/630
(58) Field of Search ................................ 406/198, 197, 406/86, 85, 51, 39; 198/766, 630; 414/502, 488, 353; 73/570.5

(56) References Cited

U.S. PATENT DOCUMENTS 5,203,209 A * 4/1993 Watkins et al. ............. 73/570.5
5,810,155 A * 9/1998 Hashimoto et al. ......... 198/630
5,890,580 A * 4/1999 Hashimoto et al. ......... 198/619
5,931,285 A * 8/1999 Madsen et al. .............. 198/762
6,029,519 A * 2/2000 Kuklinski ................... 73/570.5

FOREIGN PATENT DOCUMENTS

JP  7-024415   1/1995  ............. B06B/1/02
JP  7-137824   5/1995  ............. B65G/27/24
JP  09-169427  6/1997  ............. B65G/47/22

* cited by examiner

Primary Examiner—Joseph A. Dillon
(74) Attorney, Agent, or Firm—Morgan & Finnegan, LLP

(57) ABSTRACT

A method for transferring an object levitated by sound waves from a transporting device to an unloading device. The transporting device includes a transporting vibrator, which levitates the object with sound waves. The unloading device includes an unloading vibrator mounted on a platform. The platform is arranged at a predetermined position below the object, at which the distance between the top surface of the unloading vibrator and the bottom surface of the object is less than one half the wavelength of a standing wave generated by the unloading vibrator. The platform is then moved upward toward the object from the predetermined position to levitate the object. The unloading vibrator generates sound waves to levitate the object. The object is then levitated by the platform to a position at which the levitating force of the transporting vibrator does not affect the object.

16 Claims, 3 Drawing Sheets

METHOD FOR TRANSFERRING LEVITATED OBJECTS

BACKGROUND OF THE INVENTION

The present invention relates to a method for transferring an object levitated by sound waves.

Japanese Unexamined Patent Publication Nos. 7-24415 and 7-137824 describe apparatuses that levitate objects. Each apparatus employs a plate-like vibrator to generate sound waves and levitate an object with the sound waves. The sound waves are directed toward the object, which has a flat surface opposed to the vibrator. Further, apparatuses used to transport levitated objects have also been proposed. One apparatus blasts air against a levitated object to transport the object, and another apparatus uses a carriage, which is provided with a device that levitates an object, to transport the object.

When a levitated object is transported to a predetermined location by a transporting apparatus and then transferred from the apparatus to another location, it is preferred that the object be transferred in the levitated state. This reduces the possibility of the object being scratched or smeared. To receive an object from the transporting apparatus in a levitated state, an unloading apparatus provided with a device that levitates the object may be employed. However, when the unloading apparatus receives the levitated object from the transporting apparatus, the transfer of the object between the transporting apparatus and the unloading apparatus may become unstable when the unloading apparatus approaches the object from below.

The levitating force of the sound waves generated by the vibrator is strong in an area proximal to the vibrator where the distance from the vibrator is 50 to 500 micrometers. This area is defined as a near-field. The sound waves generated by the vibrator include a (quasi) standing wave, which has wavelength $\lambda$. In addition to the near-field, the levitating force is strong at positions corresponding to n times (n being a natural number) one half the wavelength $\lambda$ of the standing wave. These positions are defined as peak positions. The levitating force in the near-field is stronger than that at the peak positions. Accordingly, when the vibrator of the unloading apparatus approaches the bottom surface of the object, the vibrator levitates the object when the object reaches any one of the peak positions. The levitating force at each peak position is weaker than that at the near-field. Thus, if an unexpected force is applied to the levitated object for one reason or another, the object may move into the near-field from its proper position.

When the levitated object is flat and has a large surface area, it is preferred that a plurality of vibrators be used to levitate the object. However, it becomes more difficult to stably unload the object as the number of vibrators increases.

SUMMARY OF THE INVENTION

It is an object of the present invention to provide a method and apparatus that stably transfers an object levitated by sound waves from one place to another.

To achieve the above object, the present invention provides a method for transferring an object levitated above a transporting vibrator from the transporting vibrator to a platform. The transporting vibrator generates sound waves to produce a transporting levitating force that levitates the object. The method includes arranging the platform at a predetermined position below the object. The platform is provided with an unloading vibrator, the object has a bottom surface, and the unloading vibrator has a top surface. The predetermined position is determined so that the distance between the top surface of the unloading vibrator and the bottom surface of the object is less than one half the wavelength of a standing wave generated by the unloading vibrator. The method further includes moving the platform upward toward the object from the predetermined position, and levitating the object above the platform when moving the platform upward. The unloading vibrator generates sound waves to produce an unloading levitating force that levitates the object. The method also includes moving the object levitated by the platform to a position at which the transporting levitating force does not affect the object.

A further perspective of the present invention is a transfer apparatus for levitating an object with a force produced by sound waves. The transfer apparatus includes a transporting device for transporting the object. The transporting device includes a transporting vibrator for generating a transporting levitating force. The transporting vibrator has a top surface, and an unloading device for unloading the object from the transporting device. The unloading device includes unloading vibrators and a plurality of spaced, parallel prongs for holding the unloading vibrators. The unloading vibrators generate an unloading levitating force. The object has a bottom surface, and the unloading vibrators each have a top surface. The prongs are arranged at a predetermined position to unload the object from the transporting device. The predetermined position is determined so that the distance between the top surface of each unloading vibrator and the bottom surface of the object is less than one half the wavelength of a standing wave generated by the associated unloading vibrator. The prongs elevate to levitate the object with the unloading levitating force and move the object to a location where the transporting levitating force does not affect the object. The unloading levitating force is produced in an area proximal to each unloading vibrator.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 3:
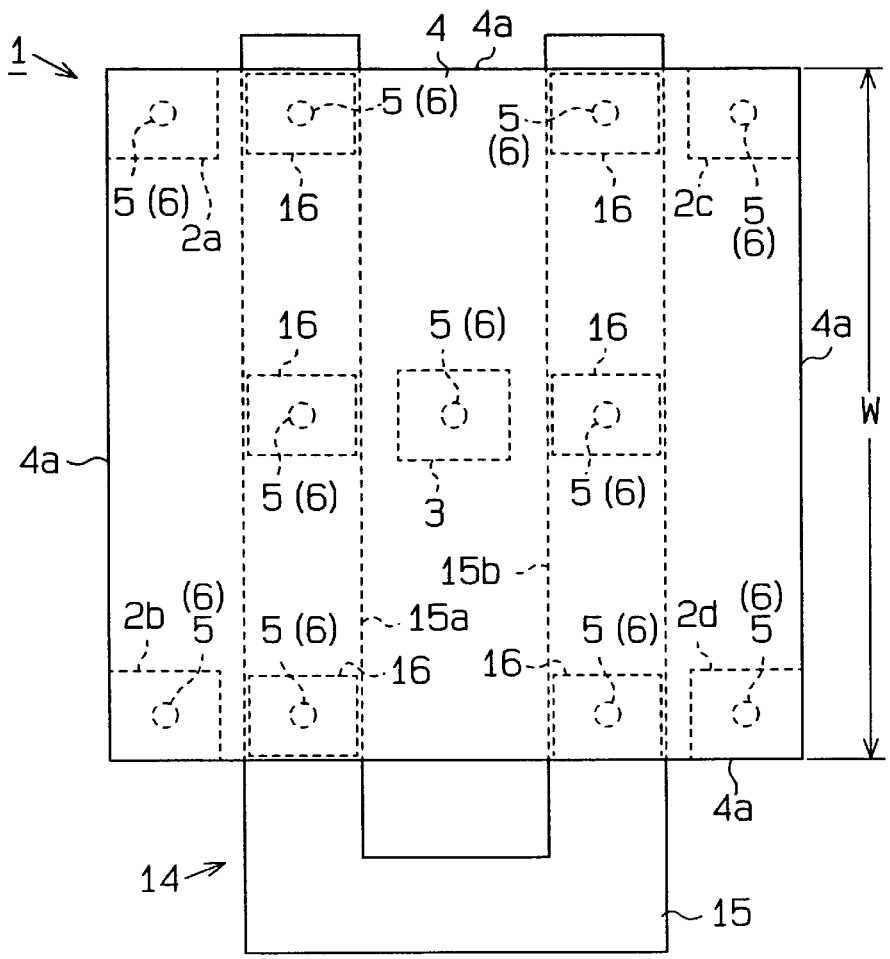
FIG. 3 is a schematic plan view showing the positional relationship between the transporting device and the unloading device of FIG. 1.

A preferred embodiment of the present invention will now be described with reference to FIGS. 1 and 3. As shown in FIG. 3, a transporting device 1 includes a plurality (in the preferred embodiment, five) of square, plate-like transporting vibrators 2a, 2b, 2c, 2d, 3. The transporting vibrators 2a–2d, 3 have the same size and shape. Four of the vibrators 2a–2d are arranged at positions corresponding to the four corners of a square object 4, which is levitated by the vibrators 2a–2d. The remaining vibrator 3 is arranged in the center of a square defined by the four vibrators 2a–2d. A horn 5 is fastened to the bottom surface of each vibrator 2a–2d, 3 by a bolt (not shown).

Figure 1:
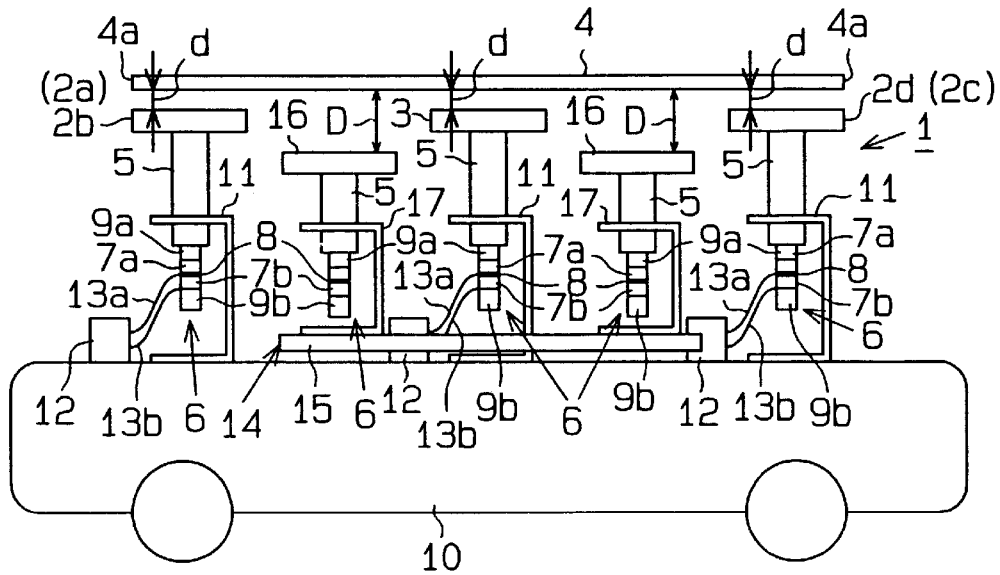
FIG. 1 is a schematic front view showing a transporting device and an unloading device of a transfer apparatus according to a preferred embodiment of the present invention.

As shown in FIG. 1, each horn 5 is cylindrical and connected to the center of the associated vibrator 2a–2d, 3. The horns 5 are perpendicular to the bottom surface of the associated vibrators 2a–2d, 3. The top surface of each vibrator 2a–2d, 3 is horizontal. A transducer 6 is fixed to the lower end of each horn 5. The associated horns 5 and transducers 6 are arranged coaxially.

Langevin transducers are employed as the transducers 6. Each transducer 6 includes annular upper and lower piezoelectric elements 7a, 7b, an annular electrode plate 8, which is arranged between the piezoelectric elements 7a, 7b, an upper metal block 9a, which is connected with the upper surface of the upper piezoelectric element 7a, and a lower metal block 9b, which is connected with the lower surface of the lower piezoelectric element 7b. The piezoelectric elements 7a, 7b, the electrode plate 8, and the metal blocks 9a, 9b are connected together by a bolt (not shown). The bolt is inserted from the lower metal block 9b and fastened with a threaded hole (not shown) formed in the upper metal block 9a. The two metal blocks 9a, 9b are electrically connected to each other by the bolt.

The transporting device 1 is secured to a carriage 10 by support brackets 11. Each transducer 6 is fixed to one of the support brackets 11 so that the top surface of the associated transporting vibrator 2a–2d, 3 is horizontal. An oscillator 12 is connected to each transducer 6. The electrode plate 8 of each transducer 6 is connected to the associated oscillator 12 by a first wire 13a. Each oscillator 12 has a ground terminal connected to the associated lower metal block 9b by a second wire 13b.

The transfer of a levitated object 4 from the transporting device 1 to an unloading device 14 will now be discussed. The transporting device 1 and the unloading device 14 form a transfer apparatus.

Referring to FIG. 3, the unloading device 14 includes a platform 15, which is used to load and unload the object 4. The platform 15 is formed by a left prong 15a and a parallel right prong 15b, the basal ends of which are connected to each other. A driving device (not shown), which is known in the art, moves the platform 15 horizontally and vertically. A sensor 25 is attached to the unloading device 14 to detect the vertical position of the platform 15.

Figure 2:
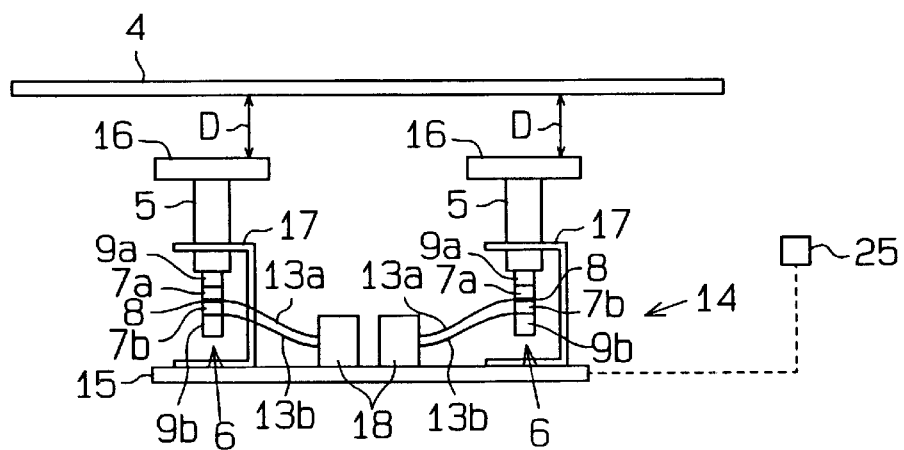
FIG. 2 is a schematic front view of the unloading device of FIG. 1.

To unload the object 4 from the transporting device 1, the two prongs 15a, 15b are moved perpendicular to the longitudinal direction of the carriage 10 and inserted between the levitated object 4 and the transporting device 1. The two prongs 15a, 15b are separated from each other so that there is no interference between the prongs 15a, 15b and the transporting vibrators 2a–2d, 3. As shown in FIG. 3, the two sides 4a of the object 4 that are perpendicular to the prongs 15a, 15b are separated by a distance W. The prongs 15a, 15b are each longer than the distance W. As shown in FIGS. 1 and 2, a plurality of unloading vibrators 16 are fixed to each prong 15a, 15b by a horn 5, a transducer 6, and a support bracket 17 in the same manner as the transporting vibrators 2a, 2d, 3. An oscillator 18 (only shown in FIG. 2) is connected to the transducer 6 of each unloading vibrator 16.

The operation of the transporting device 1 will now be discussed.

When loading the object 4 on the transporting device 1, the object 4 is arranged above the transporting vibrators 2a–2d, 3 so that the sides 4a of the object 4 are aligned with the sides of the vibrators 2a–2d faced outward from the transporting device 1. In this state, each oscillator 12 vibrates the associated transducers 6 at a predetermined resonance frequency (e.g., approximately 20 kHz) to vertically vibrate the associated horn 5. This torsionally vibrates the associated vibrators 2a–2d, 3. The torsional vibration of each vibrator 2a–2d, 3 generates sound waves (standing waves). The levitating force produced by the sound waves levitates the object 4 from the top surfaces of the vibrators 2a–2d, 3, as shown in FIGS. 1 and 3. The levitated distance d of the object 4 is 50 to 500 micrometers. The levitating force at this distance is strong. In other words, the object 4 is levitated in the near-field of the transporting vibrators 2a–2d, 3. The transporting device 1 then drives the carriage 10 to transport the levitated object 4 to a certain destination.

The unloading of the levitated object 4 from the transporting device 1 with the unloading device 14 to transfer the object 4 from the transporting device 1 to another location will now be discussed. The carriage 10 is stopped at a predetermined position in the vicinity of the unloading device 14 with the object 4 held in the levitated state. The unloading device 14 then arranges the platform 15 at a standby position. At this position, the distance D between the top surface of each unloading vibrator 16 and a plane flush with the bottom surface of the object 4 is less than one half the wavelength λ of the standing wave generated by the unloading vibrators 16 and is, for example, four to ten millimeters. In other words, the standby position is separated from the positions in which the levitating force of the sound waves generated by the each unloading vibrator 16 is strong. The average height of the transporting vibrators 2a–2d, 3 from the floor is predetermined. Thus, the unloading device 14 positions the platform 15 based on the average height referring to the detection of the sensor 25.

Then, the platform 15 moves horizontally toward the transporting device 1 to a predetermined position below the object 4. In this state, the unloading vibrators 16 are arranged below the object 4, as shown in the state of FIG. 3. When the platform 15 moves from the standby position to the predetermined position, distance D is greater than distance d. Thus, the levitating force produced by the sound waves of the unloading vibrators 16 does not have a substantial affect on the levitated object 4, and the object 4 remains levitated by the transporting vibrators 2a–2d, 3 in a stable state.

Subsequently, the platform 15 is vertically elevated. When the distance D between the unloading vibrators 16 and the object 4 becomes less than the distance d between the transporting vibrators 2a–2d, 3 and the object 4, the levitating force of the unloading vibrators 16 starts to levitate the object 4. After the platform 15 rises to a predetermined position where the levitating force of the transporting vibrators 2a–2d, 3 hardly affects the object 4, the platform 15 stops and horizontally moves away from the transporting device 1. This completes the transfer of the object 4 from the transporting device 1 to the unloading device 14. The platform 15 continues to move until reaching a predetermined unloading position, which corresponds to the location of a pallet (not shown). The platform 15 is then lowered to transfer the object 4 to the pallet. This completes the transfer of the object 4 from the transporting device 1 to the pallet.

(1) When the platform 15 is arranged below the levitated object 4, the distance D between the top surface of the unloading vibrators 16 is less than one half the wavelength λ of the standing wave generated by the unloading vibrators 16. The platform 15 is lifted from this state to unload the object 4 from the transporting device 1. Accordingly, the multiple unloading vibrators 16 of the unloading device 14 levitate the object 4 in the near-field of each vibrator 16 where the levitating force is strongest from the beginning. Thus, the levitated object 4 is stable when being transferred from the transporting device 1 to the unloading device 14.

(2) The platform 15 includes the two parallel prongs 15a, 15b, on which the unloading vibrators 16 are mounted. Since the object 4 is levitated by a multiple number of the vibrators 16, the unloading of the levitated object 4 is more stable in comparison to when employing a platform having only one prong.

(3) The unloading device 14 unloads the object 4 from the transporting device 1 in a state in which the transporting vibrators 2a–2d, 3 levitate the object 4 with the levitating force generated in the near-field of each vibrator 2a–2d, 3.

(4) A multiple number of the vibrators 16 are mounted on each of the prongs 15a, 15b. Thus, the unloading of the object 4 from the transporting device 1 is more stable than when only one vibrator is mounted on each of the prongs 15a, 15b.

(5) The transporting vibrators 2a–2d are arranged at positions corresponding to the four corners of the square object 4 levitated by the vibrators 2a–2d. The vibrators 2a–2d function to restrict the movement of the object 4 when located at such positions. Thus, when a horizontal, external force is applied to the object 4 from any one of its sides, the force levitating the object 4 counters the external force and restricts the movement of the object 4. Accordingly, the location of the vibrators 2a–2d contributes to holding the object at the same predetermined position.

(6) The single transporting vibrator 3 is located in the center of the other transporting vibrators 2a–2d. In other words, the distances between the center vibrator 3 and the outer vibrators 2a–2d are equal. Accordingly, the sound waves generated by the vibrator 3 prevents twisting of the object 4 and enables stable levitation of the object 4 even if the object 4 has a large surface area.

(7) The transporting vibrators 2a–2d are arranged so that its outer sides are aligned with the linear sides 4a of the levitated object 4. This stabilizes the object 4 at the predetermined location.

(8) The transporting device 1 includes the carriage 10. This enables the object 4 to be transported to a predetermined position in a levitated state. In comparison to when mounting a vibrator on a belt conveyor or the like and using the belt conveyor to transport the object, the carriage 10 facilitates transportation.

It should be apparent to those skilled in the art that the present invention may be embodied in many other specific forms without departing from the spirit or scope of the invention. Particularly, it should be understood that the present invention may be embodied in the following forms.

Figure 4:
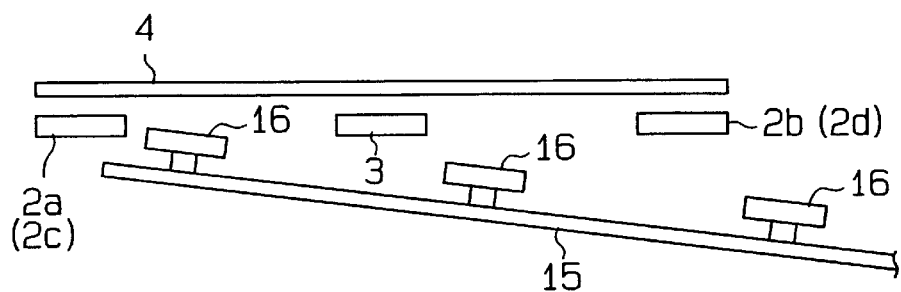
FIG. 4 is a schematic side view showing a transporting device and an unloading device of a transfer apparatus according to a further embodiment of the present invention.

The unloading operation does not necessarily have to be performed by horizontally moving the object 4 to the predetermined transfer position below the object 4. For example, the platform 15 may be moved diagonally upward to a position below the object 4 in an inclined state, as shown in FIG. 4. The platform 15 is then leveled to arrange the platform 15 at the predetermined transfer position. In this case, like the preferred embodiment, the levitating force of the unloading vibrators 16 transfers the object 4 from the transporting device 1 to the unloading device 14 in a stable manner.

Figure 5A:
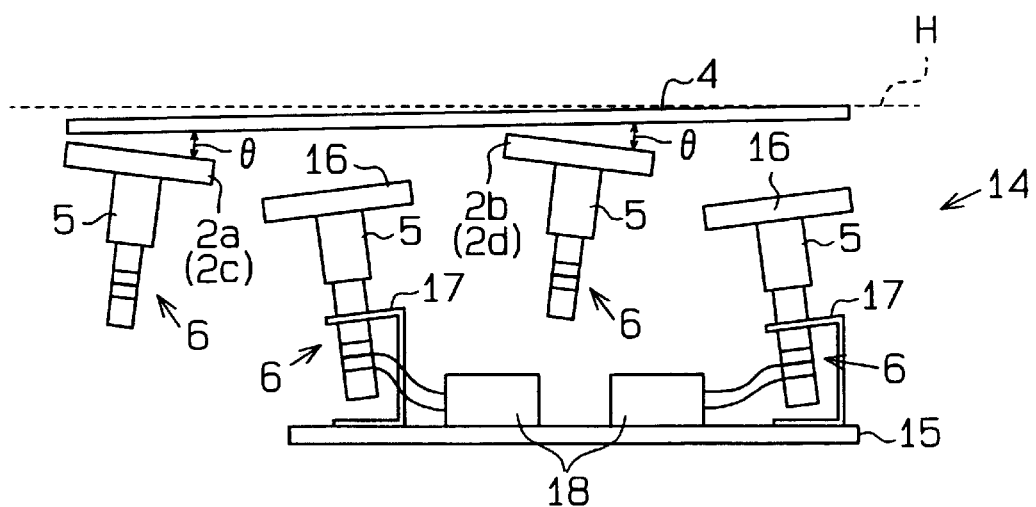
FIG. 5(a) is a schematic side view showing a transporting device and an unloading device of a transfer apparatus according to a further embodiment of the present invention.
Figure 5B:
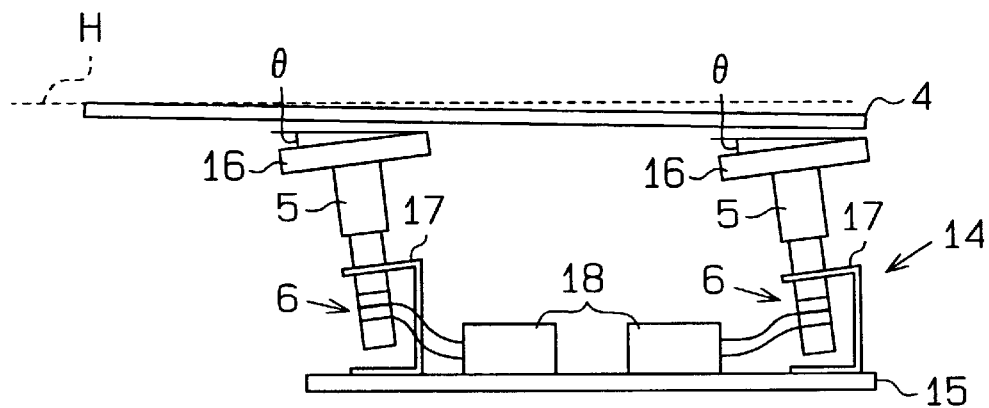
FIG. 5(b) is a schematic side view showing the unloading device of FIG. 5(b).

The object 4 does not necessarily have to be levitated in a horizontal state. For example, as shown in FIGS. 5(a) and 5(b), the transporting vibrators 2a–2d may be inclined at the same angle, and the transporting vibrators 2b, 2d, which are closer to the basal portion of the platform 15, may be located at a position higher than the other two transporting vibrators 2a, 2c, which are farther from the basal portion of the platform 15. This inclines the levitated object 4 at a predetermined angle relative to a horizontal surface H.

The optimal angle θ between the top surface of the transporting vibrators 2a–2d and the bottom surface of the object 4 varies in accordance with the weight of the object 4 and the surface area of the transporting vibrators 2a–2d. The angle θ is, for example, about 1° and normally 3° or less.

In this case, the unloading vibrators 16 are inclined at the same angle as the transporting vibrators 2a–2d but in the opposite direction. Further, the unloading vibrators 16 that are closer to the basal portion of the platform 15 are located at a position lower than that of the unloading vibrators 16 that are farther from the basal portion of the platform 15. To unload the object 4, which is levitated in an inclined state, from the carriage 10, the unloading device 14 inclines the object 4 in the opposite direction. The inclination of the object 4 changes from the state of FIG. 5(a) to the state of FIG. 5(b) when the platform 15 reaches the position where it is capable of levitating the object 4. When the unloading device 14 levitates the object 4, angle θ is formed between the bottom surface of the object 4 and the top surface of the unloading vibrators 16. In this state, the platform 15 transfers the object to a predetermined position. The inclination of the platform 15 facilitates the positioning of the platform 15 when unloading the object 4 in comparison to when the platform 15 unloads the object 4 from the transporting device 1 in a horizontal state. Thus, displacement of the object 4 is easily avoided.

The outer transporting vibrators 2a–2d of the transporting device 1 may be inclined so that the corner closest to the center vibrator 3 in each outer vibrator 2a–2d is lower than the other three corners. In this case, the outer vibrators 2a–2d are arranged so that their levitating forces are balanced. Further, the vibrators 2a–2d are inclined so that their top surfaces are inclined relative to a horizontal plane by angle θ. This improves the effect of maintaining the object 4 at the same predetermined position.

To levitate the square object 4, the locations of the transporting vibrators 2a–2d do not necessarily have to be located at positions corresponding to the four corners of the object 4 and, for example, the vibrators 2a–2d may be located at positions corresponding to the middles of the associated sides of the object 4. Further, the number of the transporting vibrators 2a–2d, 3 is not limited to five and may be varied as required. For example, the center transporting vibrator 3 may be eliminated so that the total number of the transporting vibrators is four. Alternatively, the number of the vibrators may be changed in accordance with the size of the object 4.

Instead of using the two prongs 15a, 15b, the platform 15 may be provided with any number of prongs.

When the transporting device levitates the object 4 with the transporting vibrators 2a–2d, 3, instead of using levitating force produced in the near-field of the vibrators 2a–2d, 3, the object 4 may be levitated with force produced at positions corresponding to n times (n being a natural number) one half the wavelength λ of the standing wave generated by the transporting vibrators 2a–2d, 3.

Instead of using the carriage 10, the transporting device 1 may include a belt conveyor or the like to transport a levitated object.

The transducers 6 of the transporting device 1 and the unloading device 14 may all be driven by the same oscillator.

The object 4 does not have to be square and may have other polygonal shapes or round shapes.

Each horn 5 does not have to be disk-like. For example, a disk-like plate and a rod-like projection extending from the bottom surface of the disk-like plate may form the horn 5. The horn 5 may also be box-like. Alternatively, the horn 5 may have a conical shape with its diameter increased at lower locations.

Instead of using bolts to fasten the vibrators 2a–2d, 3, 16 to the associated horns 5, the vibrators 2a–2d, 3, 16 may be adhered, brazed, or welded to the associated horns 5.

The transducers 6 do not have to be Langevin transducers and may be any type of transducer.

The present examples and embodiments are to be considered as illustrative and not restrictive, and the invention is not to be limited to the details given herein, but may be modified within the scope and equivalence of the appended claims.

What is claimed is:

1. A method for transferring an object levitated above a transporting vibrator from the transporting vibrator to a platform, wherein the transporting vibrator generates sound waves to produce a transporting levitating force that levitates the object, the method comprising:

arranging the platform at a predetermined position below the object, wherein the platform is provided with an unloading vibrator, the object has a bottom surface, the unloading vibrator has a top surface, and the predetermined position is determined so that the distance between the top surface of the unloading vibrator and the bottom surface of the object is less than one half the wavelength of a standing wave generated by the unloading vibrator;

moving the platform upward toward the object from the predetermined position;

levitating the object above the platform when moving the platform upward, wherein the unloading vibrator generates sound waves to produce an unloading levitating force that levitates the object; and moving the object levitated by the platform to a position at which the transporting levitating force does not affect the object.

2. The method according to claim 1, wherein the step of arranging the platform at a predetermined position below the object includes moving the platform so that the top surface of the platform is parallel to the bottom surface of the object.

3. The method according to claim 1, further comprising the step of confirming that the platform is arranged at the predetermined position below the object.

4. The method according to claim 1, wherein the step of arranging the platform at a predetermined position below the object includes arranging the transporting vibrator and the unloading vibrator so that the top surface of at least one of the transporting vibrator and the unloading vibrator is parallel to the bottom surface of the object.

5. The method according to claim 4, wherein the predetermined angle is 3° or less.

6. The method according to claim 1, wherein the step of arranging the platform at a predetermined position below the object includes moving the platform in an inclined state to the predetermined position and then adjusting the inclination of the platform so that the top surface of the platform is parallel to the bottom surface of the object.

7. The method according to claim 6, wherein the step of arranging the platform at a predetermined position below the object includes moving the platform diagonally toward the predetermined position.

8. The method according to claim 1, wherein the step of arranging the platform at a predetermined position below the object includes arranging the transporting vibrator and the unloading vibrator so that the top surface of at least one of the transporting vibrator and the unloading vibrator is inclined at a predetermined angle relative to the bottom surface of the object.

9. The method according to claim 1, wherein the unloading levitating force is produced in an area proximal to the unloading vibrator.

10. A method for transferring an object levitated above a transporting vibrator from the transporting vibrator to a platform, wherein the transporting vibrator generates sound waves to produce a transporting levitating force that levitates the object, the method comprising:

arranging the platform at a predetermined position below the object, wherein the platform is provided with an unloading vibrator, the object has a bottom surface, the unloading vibrator has a top surface, and the predetermined position is determined so that the distance between the top surface of the unloading vibrator and the bottom surface of the object is less than one half the wavelength of a standing wave generated by the unloading vibrator;

confirming that the platform is arranged at the predetermined position below the object;

moving the platform upward toward the object from the predetermined position;

levitating the object above the platform when moving the platform upward, wherein the unloading vibrator generates sound waves to produce an unloading levitating force that levitates the object, the unloading levitating force being produced in an area proximal to the unloading vibrator; and moving the object levitated by the platform to a position at which the transporting levitating force does not affect the object.

11. The method according to claim 10, wherein the step of arranging the platform at a predetermined position below the object includes moving the platform so that the top surface of the platform is parallel to the bottom surface of the object.

12. The method according to claim 10, wherein the step of arranging the platform at a predetermined position below the object includes arranging the transporting vibrator and the unloading vibrator so that the top surface of at least one of the transporting vibrator and the unloading vibrator is parallel to the bottom surface of the object.

13. The method according to claim 10, wherein the step of arranging the platform at a predetermined position below the object includes moving the platform in an inclined state to the predetermined position and then adjusting the inclination of the platform so that the top surface of the platform is parallel to the bottom surface of the object.

14. The method according to claim 13, wherein the step of arranging the platform at a predetermined position below the object includes moving the platform diagonally toward the predetermined position.

15. The method according to claim 10, wherein the step of arranging the platform at a predetermined position below the object includes arranging the transporting vibrator and the unloading vibrator so that the top surface of at least one of the transporting vibrator and the unloading vibrator is inclined at a predetermined angle relative to the bottom surface of the object.

16. The method according to claim 15, wherein the predetermined angle is 3° or less.

* * * * *

UNITED STATES PATENT AND TRADEMARK OFFICE
CERTIFICATE OF CORRECTION

PATENT NO. : 6,575,669 B2
DATED : June 10, 2003
INVENTOR(S) : Masaki Takasan

It is certified that error appears in the above-identified patent and that said Letters Patent is hereby corrected as shown below:

Column 8,
Line 4, delete "claim 4" and insert therefor -- claim 8 --.

Signed and Sealed this

Twenty-third Day of September, 2003

JAMES E. ROGAN
*Director of the United States Patent and Trademark Office*